US012688187B2

(12) United States Patent
Weill et al.

(10) Patent No.: US 12,688,187 B2
(45) Date of Patent: Jul. 21, 2026

(54) EVALUATION AND OPTIMIZATION OF NATURAL LANGUAGE TO DATABASE QUERY TRANSLATION

(71) Applicant: Microsoft Technology Licensing, LLC, Redmond, WA (US)

(72) Inventors: Yonathan Weill, Tel Aviv (IL); Oren Barkan, Tel Aviv (IL); Noam Koenigstein, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 244 days.

(21) Appl. No.: 18/424,694

(22) Filed: Jan. 26, 2024

(65) Prior Publication Data

US 2025/0245220 A1 Jul. 31, 2025

(51) Int. Cl.
| | |
|---|---|
| *G06F 16/20* | (2019.01) |
| *G06F 16/2452* | (2019.01) |
| *G06F 16/2453* | (2019.01) |

(52) U.S. Cl.
CPC .. *G06F 16/24522* (2019.01); *G06F 16/24534* (2019.01)

(58) Field of Classification Search
None
See application file for complete search history.

(56) References Cited

U.S. PATENT DOCUMENTS

| | | | | | |
|---|---|---|---|---|---|
| 12,079,211 | B2 * | 9/2024 | Skiles | | G06F 40/58 |
| 2016/0132556 | A1 * | 5/2016 | Nguyen | | G06F 16/24534 |
| | | | | | 707/714 |

| | | | | | |
|---|---|---|---|---|---|
| 2018/0336198 | A1 * | 11/2018 | Zhong | | G06N 3/006 |
| 2023/0103545 | A1 * | 4/2023 | Estrada | | C08F 220/1806 |
| | | | | | 216/37 |
| 2024/0184829 | A1 * | 6/2024 | Roy | | G06F 16/243 |

FOREIGN PATENT DOCUMENTS

| | | |
|---|---|---|
| CA | 3062071 A1 | 8/2023 |

OTHER PUBLICATIONS

Extended European search report received in European Application No. 25152384.1, mailed on May 13, 2025, 11 pages.

* cited by examiner

*Primary Examiner* — Belix M Ortiz Ditren
(74) *Attorney, Agent, or Firm* — Foley IP Law, PLLC

(57) ABSTRACT

Natural language to database query translation optimization is disclosed. Due to the flexibility of natural language and database query languages, translations may differ in form, yet still be valid. A natural language query is translated to a first database query in a database query language using a query translator. A first and second database query result are generated by performing a first and second database query on a database. The second database query differs from the first database query in form (e.g., order of the query parameters), but is functionally similar to the first database query, such that an ideal query translation would produce equivalent database query results (e.g., same retrieved information, even if in a different order). If the first database query result matches the second database query result, training reinforcement is provided, but if not, a training adjustment is provided for the query translator.

17 Claims, 7 Drawing Sheets

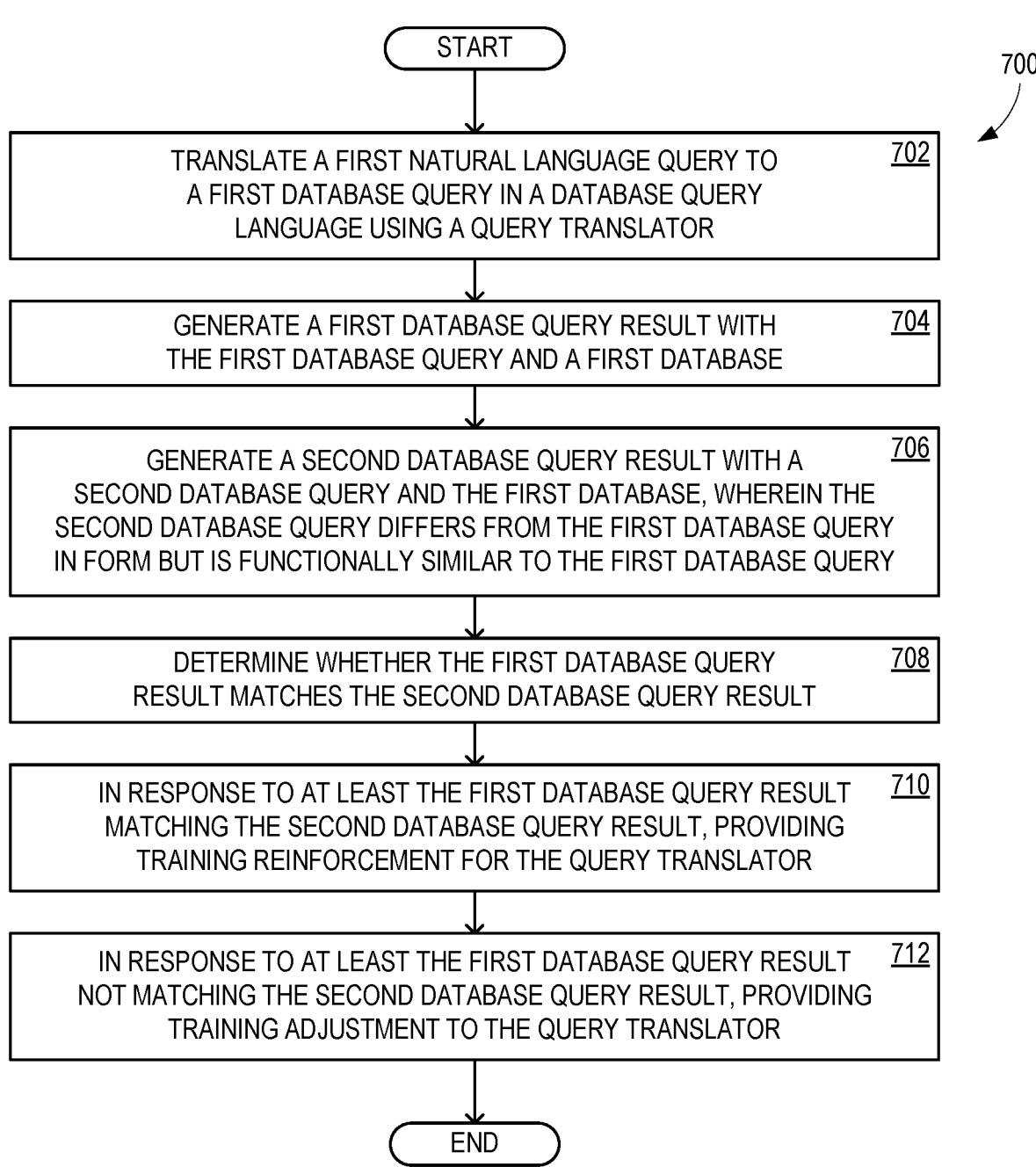

START

700

TRANSLATE A FIRST NATURAL LANGUAGE QUERY TO
A FIRST DATABASE QUERY IN A DATABASE QUERY
LANGUAGE USING A QUERY TRANSLATOR    702

GENERATE A FIRST DATABASE QUERY RESULT WITH
THE FIRST DATABASE QUERY AND A FIRST DATABASE    704

GENERATE A SECOND DATABASE QUERY RESULT WITH A
SECOND DATABASE QUERY AND THE FIRST DATABASE, WHEREIN THE
SECOND DATABASE QUERY DIFFERS FROM THE FIRST DATABASE QUERY
IN FORM BUT IS FUNCTIONALLY SIMILAR TO THE FIRST DATABASE QUERY    706

DETERMINE WHETHER THE FIRST DATABASE QUERY
RESULT MATCHES THE SECOND DATABASE QUERY RESULT    708

IN RESPONSE TO AT LEAST THE FIRST DATABASE QUERY RESULT
MATCHING THE SECOND DATABASE QUERY RESULT, PROVIDING
TRAINING REINFORCEMENT FOR THE QUERY TRANSLATOR    710

IN RESPONSE TO AT LEAST THE FIRST DATABASE QUERY RESULT
NOT MATCHING THE SECOND DATABASE QUERY RESULT, PROVIDING
TRAINING ADJUSTMENT TO THE QUERY TRANSLATOR    712

END

Figure 8:
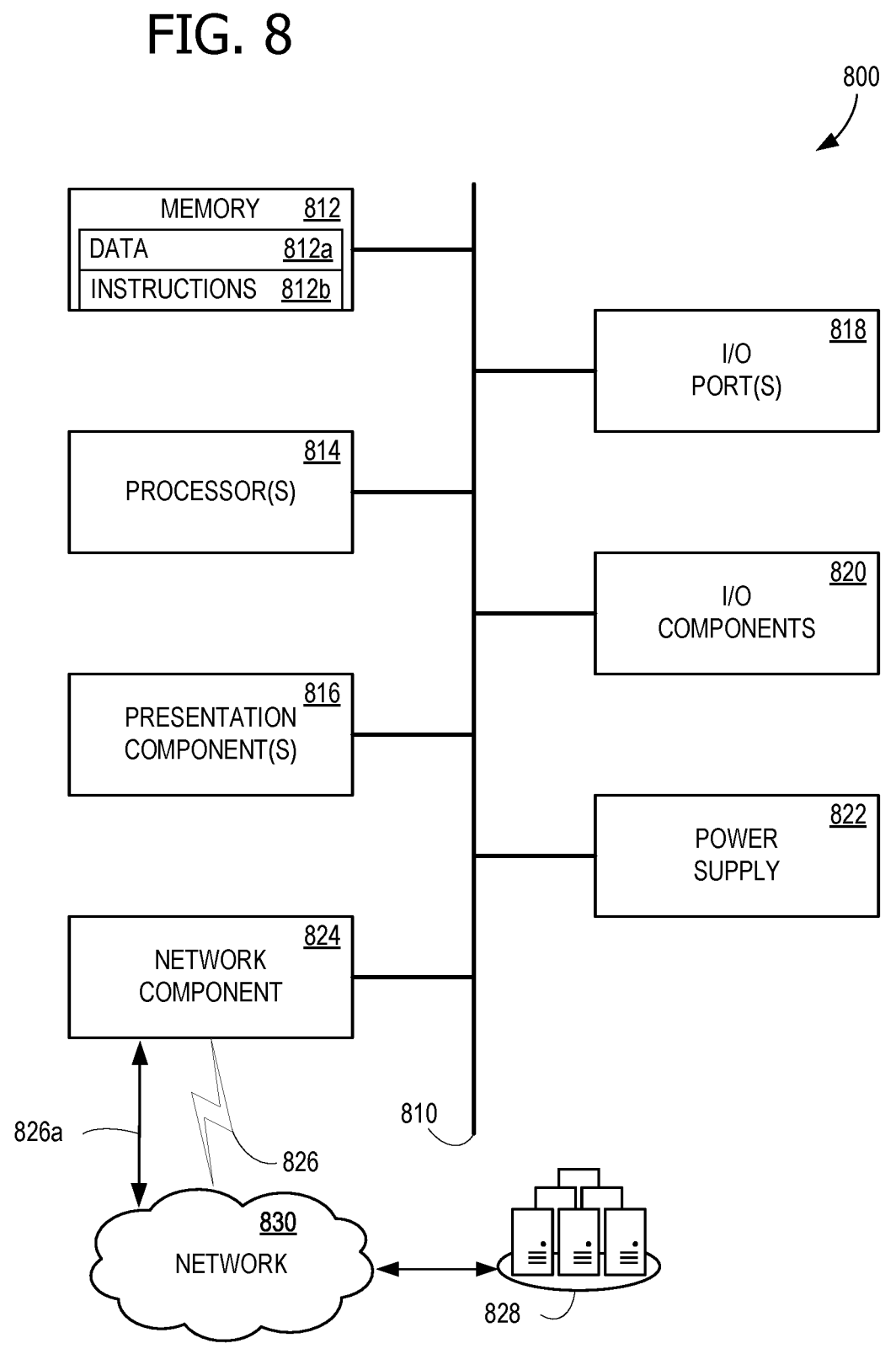

| MEMORY | 812 |
| --- | --- |
| DATA | 812a |
| INSTRUCTIONS | 812b |

PROCESSOR(S) 814

PRESENTATION COMPONENT(S) 816

NETWORK COMPONENT 824

I/O PORT(S) 818

I/O COMPONENTS 820

POWER SUPPLY 822

810

826a

826

830 NETWORK

828

EVALUATION AND OPTIMIZATION OF NATURAL LANGUAGE TO DATABASE QUERY TRANSLATION

BACKGROUND

Language models, such as large language models (LLMs), are a form of artificial intelligence (AI), within a set of machine learning (ML) models that may be used in various language-intensive tasks, such as translation. In some scenarios, the set of languages supported by translation capability extends beyond spoken languages (e.g., natural languages), and into computer-oriented languages, such as database query languages. The availability of translation from natural language to database query languages opens up the opportunity to perform meaningful database queries to people who are not already skilled in authoring database queries in a native query language.

However, for the translation to have value, it must be accurate across the wide range of natural language usage. Two different users may phrase a natural language query (intended for translation to a database query language) quite differently. Thus, there is a need for rigorous training of a natural language to database query translator. Complicating this is that, due to the flexibility of common database query languages, there is often multiple ways that a database query may be phrased, and yet still be correct. Thus, assessing the correctness of a natural language to database query translation by comparing the resulting database query to an expected result may be overly-constraining and inefficient.

SUMMARY

The disclosed examples are described in detail below with reference to the accompanying drawing figures listed below. The following summary is provided to illustrate some examples disclosed herein.

Example solutions for evaluating and optimizing natural language to database query translation include: translating a first natural language query to a first database query in a database query language using a query translator; generating a first database query result with the first database query and a first database; generating a second database query result with a second database query and the first database, wherein the second database query differs from the first database query in form but is functionally similar to the first database query; determining whether the first database query result matches the second database query result; based on at least (in response to at least) the first database query result matching the second database query result, providing training reinforcement for the query translator; and based on at least the first database query result not matching the second database query result, providing training adjustment to the query translator.

BRIEF DESCRIPTION OF THE DRAWINGS

The disclosed examples are described in detail below with reference to the accompanying drawing figures listed below:

FIGS. 5, 6, and 7 show flowcharts illustrating exemplary operations that may be performed when using example architectures, such as the architecture of FIG. 1; and FIG. 8 shows a block diagram of an example computing device suitable for implementing some of the various examples disclosed herein.

Corresponding reference characters indicate corresponding parts throughout the drawings.

DETAILED DESCRIPTION

Natural language to database query translation optimization is disclosed. Due to the flexibility of natural language and database query languages, translations may differ in form, yet still be valid. A natural language query is translated to a first database query in a database query language using a query translator. A first and second database query result are generated by querying a database with the first database query and querying the database with a second database query. The second database query differs from the first database query in form (e.g., order of the query parameters), but is functionally similar to the first database query. The second database query is functionally identical to the first database query where the second database query has similar content (although possibly in a different order of occurrence) and produces equivalent database query results (e.g., same retrieved information, even if in a different order) as the first database query. Functional similarity of two queries is measured by assessing similarity of query results of each of the queries when executed on the same database. If the first database query result is sufficiently functionally similar to the second database query result, such as by matching, training reinforcement is provided, but if not, a training adjustment is provided for the query translator.

Aspects of the disclosure solve multiple problems that are necessarily rooted in computer technology and further the art of language processing, by evaluating and optimizing natural language to database query translation (e.g., optimizing a translator). This enables a natural language to database query translator to be trained and optimized efficiently, thereby providing a practical, useful result to solve technical problems in the domain of computing and database management. This is accomplished, at least in part by, based on at least (in response to at least) a first database query result matching a second database query result (or not), providing training reinforcement (or training adjustment) for a query translator.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
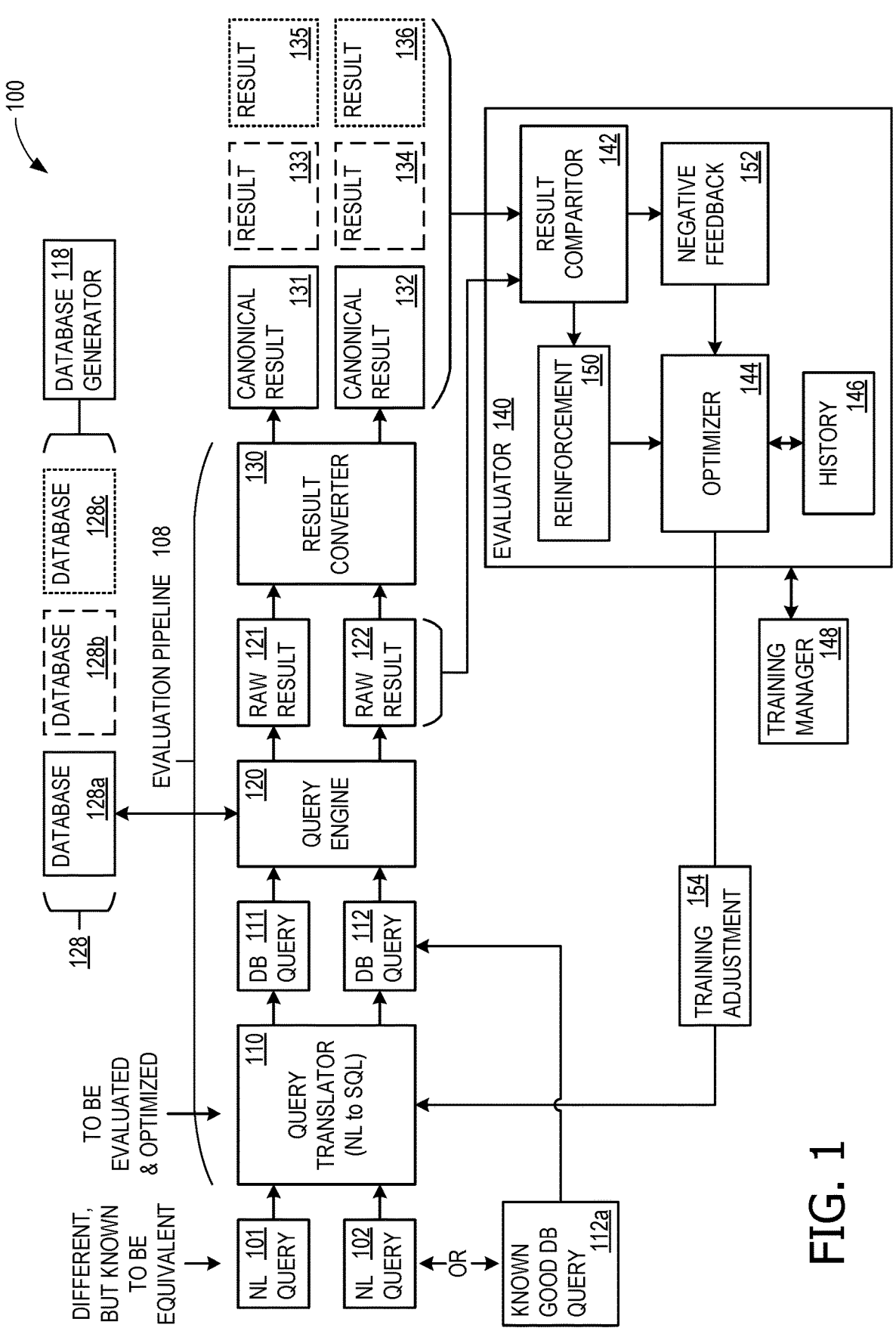
FIG. 1 illustrates an example architecture that advantageously evaluates and optimizes natural language to database query translation.

FIG. 1 illustrates an example architecture 100 that advantageously evaluates and optimizes natural language to database query translation by a query translator 110, which is a natural language to database query translator. Query translator 110 translates a natural language query 101 to a database query 111, which is executed by a query engine 120 on a database 128a to produce (generate) a database query result 121. Query engine 120 also executes a database query 112 on database 128*a* to produce (generate) a database query result 122. It is database query result 121 that is compared with database query result 122, to evaluate whether query translator 110 is translating correctly, rather than comparing database query 111 with database query 112. Database query result 121 and database query result 122 are identified in FIG. 1 as "raw" results because they may not be in a form that is suitable for comparison, and require further processing, as described below.

This approach accommodates the inherent variability in highly flexible languages that permits multiple forms to be correct, when correct is defined as producing a predetermined result. Thus, in some examples, one of the database query results is deemed correct or expected (and thus its corresponding database query is correct or expected), and it is the translation of the natural language query associated with the other database query result that is being tested for correctness. For example, database query result 122 may be the expected result and the translation of natural language query 101 to a database query 111 that is being tested.

This approach may be facilitated when database query 112 is known good database query 112*a* that is carefully crafted by an expert database query language programmer. In some examples, however, a second approach may be used. A natural language query 102, that is known to be a natural language equivalent of natural language query 101, although different in form or expression or syntax, is provided to query translator 110 to translate into database query 112. This second approach tests the two different natural language expressions together, as opposed to requiring a serial test with the first approach.

Figure 4:
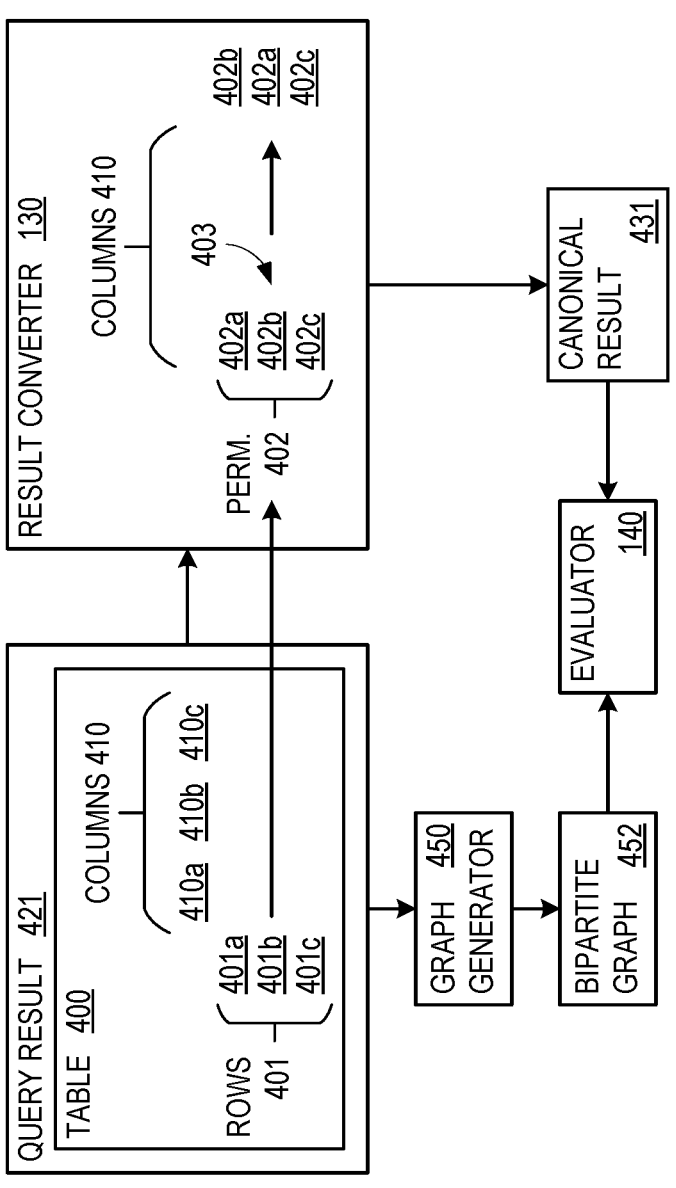
FIG. 4 illustrates alternative optional workflows used in comparing database query results that may be generated within examples of the architecture of FIG. 1.

In some examples, each database query result is presented in the form of a table having rows and columns (which is shown in FIG. 4). In some scenarios, a difference in a count of columns between database query results precludes a finding that the database query results match. In such examples, a results converter 130 transforms each of the database query results into canonical forms for comparison. For examples, database query result 121 is transformed into a canonical query result 131 and database query result 122 is transformed into a canonical query result 132. This is described in relation to FIG. 4. Together, query translator 110, query engine 120, and results converter 130 comprise an evaluation pipeline 108.

In some scenarios, however, a difference in a count of columns between database query results does not preclude a finding that the database query results match. In such examples, a graph generator 450 (shown in FIG. 4) transforms the database query results into a bipartite graph 452 for the purposes of comparison. This is also described in relation to FIG. 4.

As an example, natural language query 101 may be "What is the phone number of John from National Airlines?" and database query 111 may be "SELECT mobile_phone, firstname, lastname from Contacts WHERE firstname='John'". Database query 112, which may be labeled as "golden" or something similar to denote that it is known to be correct, may be "SELECT firstname, lastname, mobile_phone from Contacts WHERE firstname='John'." Both of these database queries request the same information, although in different order. The expected database query result 122 may then be a table with a heading of "firstname|lastname|mobile_phone" (where each column denotes a particular data field), and a data row of "John|Smith|123456789". The database query language may comprise structured query language (SQL), noSQL, or another language.

An evaluator 140 performs the evaluation of whether database query result 121 matches database query result 122, and based on that determination, whether training (optimization) of query translator 110 should receive a training reinforcement 150 or a negative feedback 152. Evaluator 140 has an optimizer that is used in each training step to modify parameters of query translator 110. The modification is based on at least both the current result comparison (whether the database result matches the expected result) and previous result comparisons.

Evaluator 140 has a results comparator 142 that compares either canonical results (e.g., canonical query result 131 and canonical query result 132) or bipartite graphs 452 (as shown in FIG. 4). Results comparator 142 produces (generates) training reinforcement 150 and negative feedback 152 for an optimizer 144 that generates a training adjustment 154 for query translator 110. In some examples, evaluator 140 and optimizer 144 implement reinforcement learning with Bayesian optimization.

For the reinforcement learning aspect, a policy function (which may be a neural network) is used to select a next action of an agent in an environment. The selected action and the effect on the environment are observed and interpreted as a reward (or lack of reward) using a reward function. The reward is used to update the policy function. In some examples, query translator 110 performs the role of a reinforcement learning policy function. Query translator 110 selects a next action which is one of several possible translations of a query (e.g., natural language query 101). The selected translation (e.g., database query 111) is observed and interpreted as a reward (or negative reward) by evaluator 140, because evaluator 140 performs the matching process.

In scenarios in which evaluator 140 compares bipartite graphs, the comparison may comprise comparing statistics describing the topology of the graphs, such as by counting the number of nodes, the number of branches, the number of loops and comparing these features of the two queries to compute a numerical value. In scenarios in which evaluator 140 compares canonical query results, the comparison may comprise counting a number of words or parts of words that are the same between the canonical query results being compared or using other rules to compute the comparisons. In some examples, the result of a comparison is a numerical value. In some examples, evaluator 140 uses a hybrid or combination of the topology statistic comparison and the word or part of word comparison. In some examples, the output of result comparator 142 is also a numerical value. If that numerical value is above a threshold, result comparator 142 has determined the queries are similar (positive reward), but if the numerical value is below the threshold, result comparator 142 has determined the queries are dissimilar (negative reward). Evaluator 140 therefore comprises a reward function of the reinforcement learning. (because evaluator 140 comprises result comparator 142).

In order to use the reward to update the policy function, an objective function may be used. Generally, to update a neural network (such as the policy function of a reinforcement learning arrangement), an objective function is used to determine how to update the policy function in the light of a training example. In some examples, Bayesian optimization is used so that no objective function is needed to be specified in advance. In some examples, the optimization function is considered a random function initially (at the start of the learning) and a prior probability distribution is used to represent belief about the behavior of the optimization function. Information about the prior probability distribution is gathered from observations of the reward. The prior probability distribution is updated to form a posterior distribution over the objective function. The posterior distribution is used to construct an acquisition function and the maximum of the acquisition function is found using the optimizer (any suitable well-known optimizer is used such as numerical optimization, or Newton's method or quasi-Newton methods). In this way the policy function (query translator 110) is updated using Bayesian reinforcement learning.

In some examples, optimizer 144 uses a training history 146 to reverse a prior training adjustment (e.g., an earlier training adjustment 154 that had been provided to optimizer 144 at a previous time), and/or avoid generating training adjustment 154 that would have a detrimental effect on the performance of optimizer 144. In some examples, a training manager 148 manages the operations of evaluator 140 and the cycle of providing test cases (e.g., new differing versions of natural language query 101) and managing test databases to ensure ongoing or continuous training and improvement of query translator 110.

There are scenarios in which an incorrect translation could produce a false positive match of database query results, such as null results. If no data is found for either of two functionally different database queries, the null results match-even when the queries are functionally different and the training case should not receive reinforcement.

To counteract this phenomenon, some examples use a database generator 118 that generates a plurality of databases 128 that includes (as shown) database 128a, a database 128b, and a database 128c. The idea is that for a given pair of queries, such as database query 111 and database query 112, if both queries return null results for one database within plurality of databases 128, this should not be the case across all of plurality of databases 128. The larger the databases or number of databases, the more this likelihood is reduced. When at least one of the queries produces a non-null result, any functional difference (if one exists) between the queries will be identified and addressed by a suitable training adjustment 154. In some examples, plurality of databases 128 comprises training data that may be random or have random components, and/or be generated specifically to minimize the likelihood of null results.

FIG. 1 shows a database query result 133 corresponding to database query 111 being performed on database 128b, a database query result 134 corresponding to database query 112 being performed on database 128b, a database query result 135 corresponding to database query 111 being performed on database 128c, and a database query result 136 corresponding to database query 112 being performed on database 128c. Database query result 133 is compared with database query result 134, and database query result 135 is compared with database query result 136, either in canonical form, or using a bipartite graph.

Figure 2:
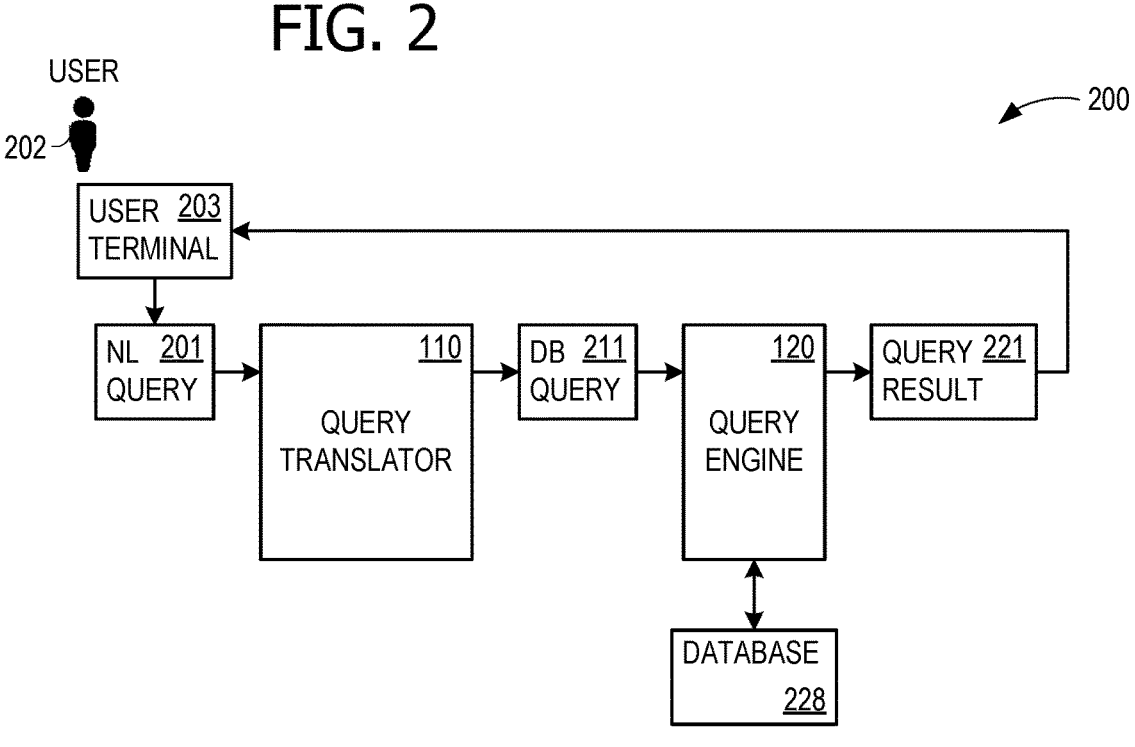
FIG. 2 illustrates an exemplary operational environment for employing a natural language to database query translator optimized (trained) by the example architecture of FIG. 1.

FIG. 2 illustrates an exemplary operational environment 200 for employing Query translator 110 that has been optimized (trained) in architecture 100. A user 202 uses a user terminal 203 to author a natural language user query 201. Query translator 110 translates natural language user query 201 to a user database query 211. Query engine 120 performs a database query by executing user database query 211 on an operational database 228 to generate a query result 221 that is returned to user 202 at user terminal 203.

Figure 3:
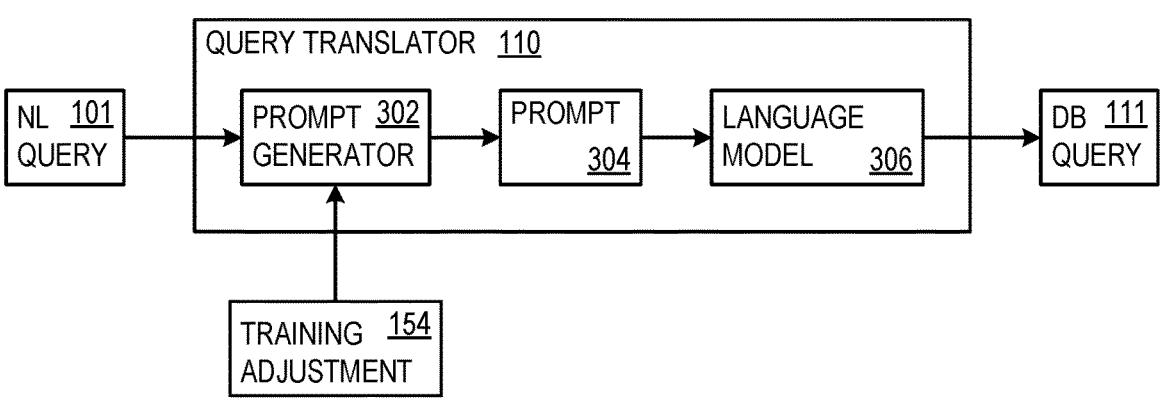
FIG. 3 illustrates further detail for the natural language to database query translator of FIG. 1.

FIG. 3 illustrates further detail for the training/optimization of Query translator 110. Query translator 110 is shown as comprising at least a prompt generator 302 that generates a prompt 304 for natural language query 101, and a language model 306 (which may be an LLM) that uses prompt 304 to generate database query 111. That is, prompt generator 302 is operative to generate prompt 304 for language model 306. Prompt 304 enables language model 306 to translate natural language query 201 (and other natural language queries) into a database query language that is suitable for databases 128a-128c and 228. In some examples, query translator 110 comprises artificial intelligence (AI) in the form of a machine language (ML) model or a multimodal model (MM), and may further include a transformer architecture.

In some examples, language model 306 comprises a generative pre-trained transformer, such as GPT-4, BLOOM, Llama, BARD, GEMINI, or other ML language model with a transformer architecture that is able to translate natural language queries into database query language queries using a database query language that is suitable for databases 128a-128c. A transformer architecture is one which computes contextualized embeddings and is able to translate between natural language and database query languages using cross-attention and optionally self-attention. Some examples of query translator 110 may have additional components.

In some examples, prompt generator 302 comprises artificial intelligence (AI) in the form of an ML model or a multimodal model (MM), and training adjustment 154 is provided to prompt generator 302 in accordance with the type of training that is suitable for adjusting ML models of the type of prompt generator 302. For example, training reinforcement 150 may signal to optimizer 144 to not further alter prompt generator 302 and identify the configuration of prompt generator 302 as performing acceptably on the current training case, whereas training adjustment 154 may alter prompt generator 302 to cause prompt generator 302 to generate specific instructions (e.g., using training history 146 to revert prompt generator 302 to a prior-identified configuration that performs acceptably or another change).

FIG. 4 illustrates alternative optional workflows used in comparing database query results. Database query result 421 alternatively represents database query result 121 and database query result 122, and canonical query result 431 alternatively represents canonical query result 131 and canonical query result 132 that are provided to evaluator 140. Results converter 130 operates on one database query result at a time. Graph generator 450 generates bipartite graph 452 using both database query result 121 and database query result 122 together.

Database query result 421 is presented as a table 400 having rows 401 and columns 410. Rows 401 has a row 401a, a row 401b, and a row 401a. Columns 410 has a column 410a, a column 410b, and a column 410c. In some examples, a database query result may have a much larger number of rows and/or columns. In general, a different order of rows between database query result 121 and database query result 122 does not preclude database query result 121 from matching database query result 122. However, if a database query specified row order, then a difference in the row orders does preclude database query result 121 from matching database query result 122. In some examples, floating point and integer values may be equated (i.e., numeric type does not matter), although strings (e.g., AnsiString) and integer values cannot be equated.

Results converter 130 is used when a difference in a count of columns 410 between database query result 121 and database query result 122 precludes database query result 121 from matching database query result 122. Graph generator 450 is used when a difference in a count of columns 410 between database query result 121 and database query result 122 does not preclude database query result 121 from matching database query result 122.

Figure 6:
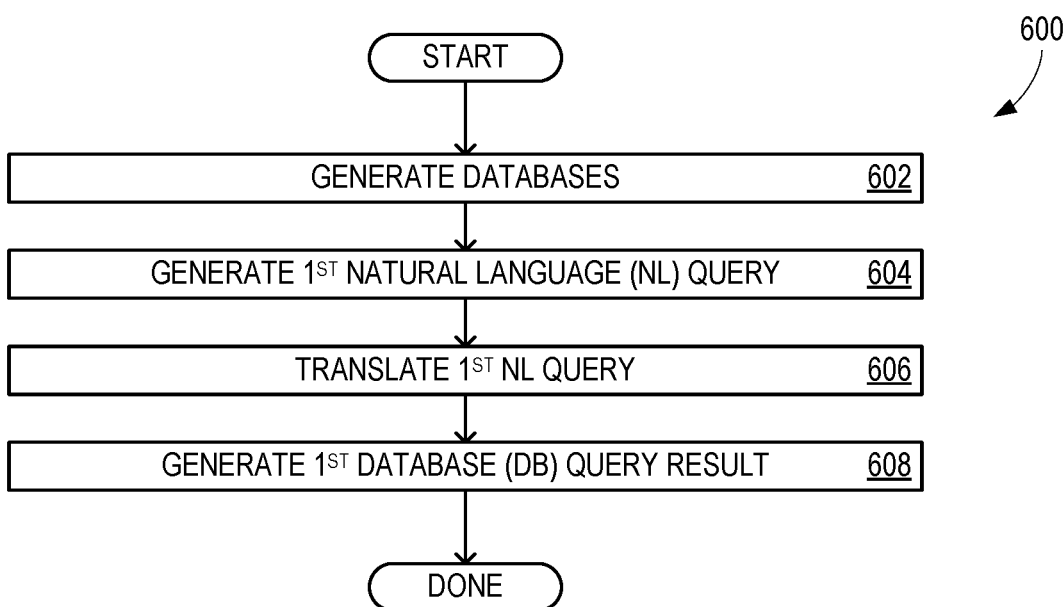

The operation of results converter 130 is also described in relation to FIG. 6. A column permutation 402, which has a row 402*a*, row 402*b*, and row 402*c*, is produced by mapping each row of rows 401 to a row of column permutations 402 that sorts values in the row in lexicographic order. A lexicographic order is an arrangement of characters, words, or numbers in alphabetical order (e.g., letters are sorted from A-Z). A row 403 is the row that yields a smallest lexicographic order when applying its corresponding permutation (shown as row 402*b*). Row 402*a*, row 402*b*, and row 402*c* correspond to row 401*a*, row 401*b*, and row 401*c*, respectively. All of columns 410 are sorted using the column permutation of identified row 403 for the sort order. The rows of column permutations 402 are then sorted in lexicographic order. The result is shown changing from the order 401*a*-402*a*-403*a* to 402*b*-402*a*-402*c*.

Evaluator 140 determines a match by equating the corresponding rows and columns of canonical query result 131 and canonical query result 132. If all items are individually equal to their corresponding counterpart, database query result 121 matches database query result 122. If there are any differences, then database query result 121 does not match database query result 122.

Graph generator 450 constructs bipartite graph 452 by connecting columns of database query result 121 with columns of database query result 122. A bipartite graph is a graph where the vertices can be divided into two disjoint sets such that all edges connect a vertex in one set to a vertex in another set. A maximum matching is identified in bipartite graph 452. If the maximum matching covers all columns in database query result 121 and database query result 122, database query result 121 matches database query result 122. If there are any unmatched columns, then database query result 121 does not match database query result 122.

Figure 5:
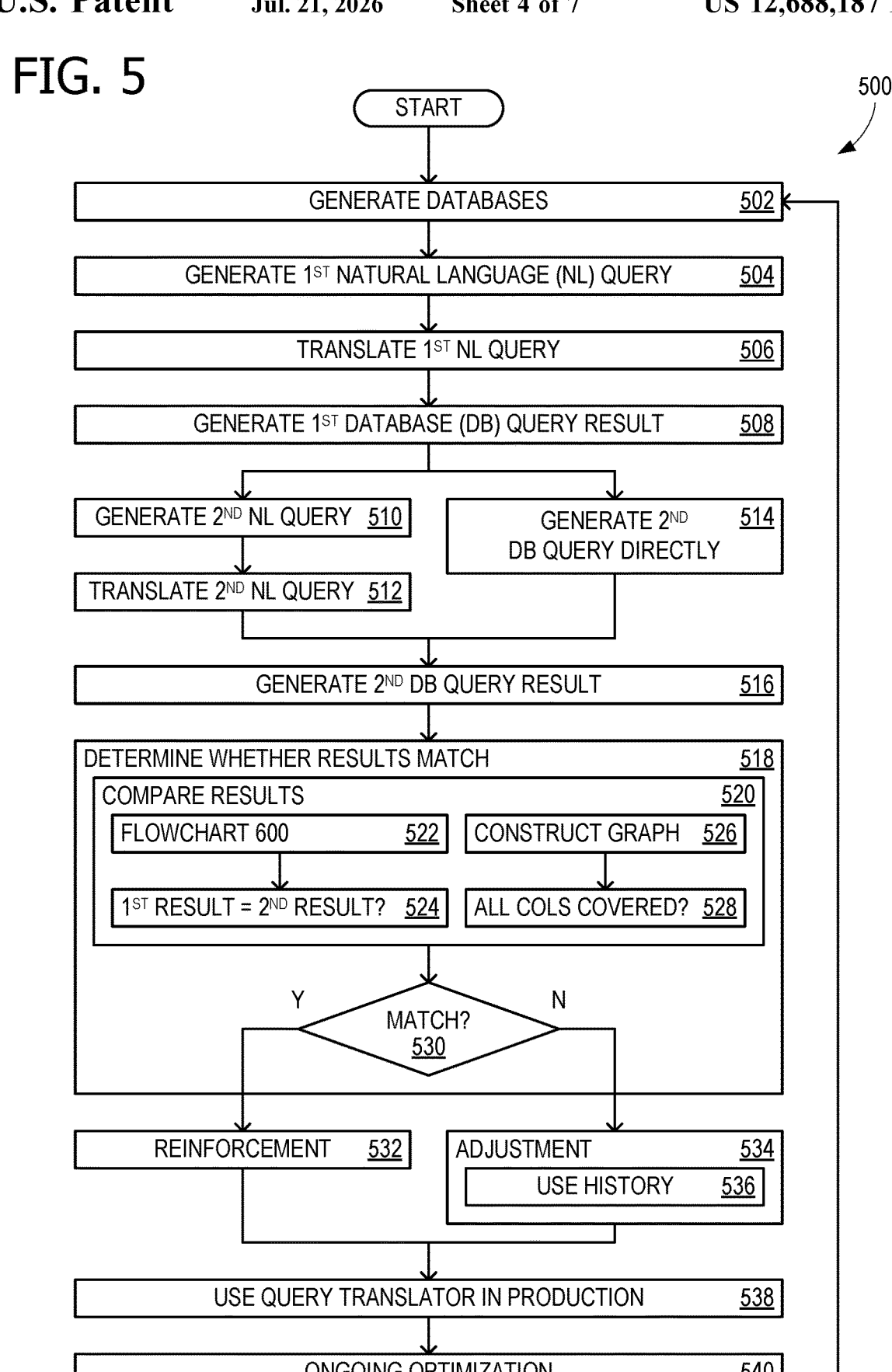

FIG. 5 shows a flowchart 500 illustrating exemplary operations that may be performed by architecture 100. In some examples, operations described for flowchart 500 are performed by computing device 800 of FIG. 8. In some examples, flowchart 500 performs optimization on query translator 110 by iteratively determining whether two database query results match and based on at least the determination, providing training reinforcement or training adjustment to query translator 110.

Flowchart 500 commences with generating plurality of databases 128 having differing content (e.g., to minimize the likelihood of null results) in operation 502. Natural language query 101 is generated in operation 504, and operation 506 uses query translator 110 to translate natural language query 101 to database query 111 in a database query language. Operation 508 generates database query result 121 with database query 111 and database 128*a*.

There are two paths shown for flowchart 500, based on whether two translations are to be compared (operations 510 and 512), or a translation is to be compared with a known good database query 112*a* (operation 514). Operation 510 generates natural language query 102, which differs from natural language query 101 in form but is functionally similar to natural language query 101, and operation 512 uses query translator 110 to translate natural language query 102 to database query 112 in the database query language. Database query 112 is generated (as known good database query 112*a*), without using query translator 110, in operation 514. Operation 516 generates database query result 122 with database query 112 and database 128*a*.

Operation 518 determines whether database query result 121 matches database query result 122, using operations 520-530. Operation 520 compares database query result 121 with database query result 122, using operations 522-528. There are two paths shown for flowchart 500, based on whether a difference in a count of columns between database query result 121 and database query result 122 precludes database query result 121 matching database query result 122. If a difference in the count does preclude matching, operations 522 and 524 are used, employing results converter 130 as shown in FIG. 4. If a difference in the count does not preclude matching, operations 526 and 528 are used, employing graph generator 450 of FIG. 4.

Operation 522 uses flowchart 600 of FIG. 6 to transform database query result 121 to canonical query result 131 and to transform database query result 122 to canonical query result 132. Operation 524 determines whether canonical query result 131 equals database query result 122. Operation 526 constructs bipartite graph 452 connecting columns of database query result 121 with columns of database query result 122, using graph generator 450, and identifies a maximum matching in bipartite graph 452. Operation 528 determines whether the maximum matching covers all columns in database query 111 and database query result 122. Decision operation 530 represents the yes/no determination of a match between database query 111 and database query result 122.

If there is a match, operation 532 provides training reinforcement 150. However, if there is not a match, operation 534 provides training adjustment 154 to optimize query translator 110 (e.g., performing parameter tuning for prompt generator 302 of query translator 110). In some examples, operation 536 uses training history 146 to at least partially reverse a prior training adjustment 154 when generating the current training adjustment 154.

Operations 508-536 may be iterated multiple times for different databases of plurality of databases 128. For example, in a subsequent pass through flowchart 500, operation 508 generates database query result 133 with database query 111 and database 128*b*; operation 516 generates database query result 134 with database query 112 and database 128*b*; and operation 518 determines whether database query result 133 matches database query result 134.

Operation 538 uses query translator 110 to translate natural language user query 201 and perform user database query 211 after at least some optimization of query translator 110 (e.g., after training adjustment 154). Operation 540 continues to optimize query translator 110 even after operational use, within ongoing optimization, moving flowchart 500 back to operation 502.

FIG. 6 shows a flowchart 600 illustrating exemplary operations that may be performed by architecture 100. In some examples, operations described for flowchart 600 are performed by computing device 800 of FIG. 8. Flowchart 600 transforms database query result 421 (or database query result 121 or 122) to canonical query result 431 (or canonical query result 131 or 132) and commences with operation 602 that maps each of rows 401 of database query result 421 to one of column permutations 402 that sorts values in the row in lexicographic order.

Operation 604 identifies row 402*b* as the row 403 that yields a smallest lexicographic order when applying its corresponding permutation. Operation 606 sorts columns 410 using the column permutation of identified row 403. Operation 608 sorts rows 401 (now shown as column permutations 402) in lexicographic order.

FIG. 7 shows a flowchart 700 illustrating exemplary operations that may be performed by architecture 100. In some examples, operations described for flowchart 700 are performed by computing device 800 of FIG. 8. Flowchart 700 commences with operation 702, which includes translating a first natural language query to a first database query in a database query language using a query translator. Operation 704 includes generating a first database query result with the first database query and a first database.

Operation 706 includes generating a second database query result with a second database query and the first database, wherein the second database query differs from the first database query in form but is functionally similar to the first database query. Operation 708 includes determining whether the first database query result matches the second database query result. Operation 710 includes based on at least the first database query result matching the second database query result, providing training reinforcement for the query translator. Operation 712 includes, based on at least the first database query result not matching the second database query result, providing training adjustment to the query translator.

ADDITIONAL EXAMPLES

An example system comprises: a processor; and a computer-readable medium storing instructions that are operative upon execution by the processor to: translate a first natural language query to a first database query in a database query language using a query translator; generate a first database query result with the first database query and a first database; generate a second database query result with a second database query and the first database, wherein the second database query differs from the first database query in form but is functionally similar to the first database query; determine whether the first database query result matches the second database query result; based on at least the first database query result matching the second database query result, providing training reinforcement for the query translator; and based on at least the first database query result not matching the second database query result, providing training adjustment to the query translator.

An example computer-implemented method comprises: translating a first natural language query to a first database query in a database query language using a query translator; generating a first database query result with the first database query and a first database; generating a second database query result with a second database query and the first database, wherein the second database query differs from the first database query in form but is functionally similar to the first database query; determining whether the first database query result matches the second database query result; based on at least the first database query result matching the second database query result, providing training reinforcement for the query translator; and based on at least the first database query result not matching the second database query result, providing training adjustment to the query translator.

One or more example computer storage devices have computer-executable instructions stored thereon, which, on execution by a computer, cause the computer to perform operations comprising: translating a first natural language query to a first database query in a database query language using a query translator; generating a first database query result with the first database query and a first database; generating a second database query result with a second database query and the first database, wherein the second database query differs from the first database query in form but is functionally similar to the first database query; determining whether the first database query result matches the second database query result; based on at least the first database query result matching the second database query result, providing training reinforcement for the query translator; and based on at least the first database query result not matching the second database query result, providing training adjustment to the query translator.

Alternatively, or in addition to the other examples described herein, examples include any combination of the following:

after the training adjustment, using the query translator to translate a natural language user query;

comparing the first database query result with the second database query result comprises transforming the first database query result to a first canonical query result;

comparing the first database query result with the second database query result further comprises transforming the second database query result to a second canonical query result;

determining whether the first database query result matches the second database query result comprises determining whether the first canonical query result equals the second database query result;

transforming a database query result to a canonical query result comprises mapping each row of the database query result to a column permutation that sorts values in the row in lexicographic order;

transforming a database query result to a canonical query result further comprises identifying the row that yields a smallest lexicographic order when applying its corresponding permutation;

transforming a database query result to a canonical query result further comprises sorting columns of the database query result using the column permutation of the identified row;

transforming a database query result to a canonical query result further comprises sorting rows of the database query result in lexicographic order;

comparing the first database query result with the second database query result comprises constructing a bipartite graph connecting columns of the first database query result with columns of the second database query result;

comparing the first database query result with the second database query result further comprises identifying a maximum matching in the bipartite graph, wherein determining whether the first database query result matches the second database query result comprises determining whether the maximum matching covers all columns in the first database query and the second database query result;

generating a plurality of databases having differing content;

generating a third database query result with the first database query and a second database of the plurality of databases;

generating a fourth database query result with the second database query and the second database;

determining whether the third database query result matches the fourth database query result;

based on at least the third database query result matching the fourth database query result, providing training reinforcement for the query translator;

based on at least the third database query result not matching the fourth database query result, providing a training adjustment to the query translator;

generating the training adjustment using a training history to at least partially reverse a prior training adjustment;

translating a second natural language query to the second database query in the database query language using the query translator;

generating the first natural language query;

the database query language comprises SQL;

generating the second natural language query;

the second natural language query differs from the first natural language query in form but is functionally similar to the first natural language query;

generating the second database query without translation;

the second database query result comprises an expected result;

each database query result is presented as a table having rows and columns;

when a difference in a count of columns between the first database query result and the second database query result precludes the first database query result matching the second database query result, transforming the first database query result to the first canonical query result;

determining whether the first canonical query result equals the second database query result comprises equating floating point and integer values;

determining whether the first canonical query result equals the second database query result comprises not equating strings and integer values;

when a difference in a count of columns between the first database query result and the second database query result does not preclude the first database query result matching the second database query result, constructing the bipartite graph;

the training adjustment comprises parameter tuning for a prompt generator of the query translator;

performing Bayesian optimization on the query translator;

the Bayesian optimization comprises iteratively determining whether two database query results match and based on at least the determination, providing training reinforcement or training adjustment to the query translator;

the training reinforcement and the training adjustment comprise Bayesian optimization; and after using the query translator to translate a natural language user query, continuing to optimize the query translator.

While the aspects of the disclosure have been described in terms of various examples with their associated operations, a person skilled in the art would appreciate that a combination of operations from any number of different examples is also within scope of the aspects of the disclosure.

Example Operating Environment

FIG. 8 is a block diagram of an example computing device 800 (e.g., a computer storage device) for implementing aspects disclosed herein, and is designated generally as computing device 800. In some examples, one or more computing devices 800 are provided for an on-premises computing solution. In some examples, one or more computing devices 800 are provided as a cloud computing solution. In some examples, a combination of on-premises and cloud computing solutions are used. Computing device 800 is but one example of a suitable computing environment and is not intended to suggest any limitation as to the scope of use or functionality of the examples disclosed herein, whether used singly or as part of a larger set.

Neither should computing device 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer storage memory 812, one or more processors 814, one or more presentation components 816, input/output (I/O) ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more buses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media referenced below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812a and instructions 812b that are executable by processor 814 and configured to carry out the various operations disclosed herein. Thus, computing device 800 comprises a computer storage device having computer-executable instructions 812b stored thereon.

In some examples, memory 812 includes computer storage media. Memory 812 may include any quantity of memory associated with or accessible by the computing device 800. Memory 812 may be internal to the computing device 800 (as shown in FIG. 8), external to the computing device 800 (not shown), or both (not shown). Additionally, or alternatively, the memory 812 may be distributed across multiple computing devices 800, for example, in a virtualized environment in which instruction processing is carried out on multiple computing devices 800. For the purposes of this disclosure, "computer storage media," "computer storage memory," "memory," and "memory devices" are synonymous terms for the memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represents an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826a to a remote resource 828 (e.g., a cloud resource) across network 830. Various different examples of communication links 826 and 826a include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a computer-readable medium storing programming instructions for execution by the processor, the programming instructions, upon execution by the processor, causing the system to perform the following operations:

receiving, by a query translator, a natural language query;

translating, via a prompt generator of the query translator, the natural language query into a first database query based on a database query language;

processing the first database query using a large language model (LLM) to generate a first database query result;

processing a second database query using the LLM to generate a second database query result, wherein the second database query is a natural language equivalent of the first database query that has a different form, expression, or syntax than the first database query;

transforming the first database query result into a first canonical query result and the second database query result into a second canonical query result; and providing a training adjustment to the query translator in response to the first canonical query result mismatching the second canonical query result, the training adjustment prompting the query translator to adjust the prompt generator in response to the training adjustment.

2. The system of claim 1, wherein transforming the first database query result into the first canonical query result comprises:

mapping each row of the first database query result to a column permutation that sorts values in the corresponding row of the first database query result in lexicographic order;

identifying the row of the first database query result that yields a smallest lexicographic order when applying its corresponding permutation;

sorting columns of the first database query result using the column permutation of the identified row of the first database query result; and sorting rows of the first database query result in lexicographic order to obtain the first canonical query result.

3. The system of claim 1, wherein the programming instructions further cause the system to perform the following operations:

constructing a bipartite graph connecting columns of the first database query result with columns of the second database query result; and identifying a maximum matching in the bipartite graph; and determining whether the maximum matching covers all columns in the first database query and the second database query result.

4. The system of claim 1, wherein the programming instructions further cause the system to perform the following operations:

generating a plurality of databases having differing content;

generating a third database query result with the first database query and a second database of the plurality of databases;

generating a fourth database query result with the second database query and the second database;

determining whether the third database query result matches the fourth database query result;

in response to at least the third database query result matching the fourth database query result, providing training reinforcement for the query translator; and in response to at least the third database query result not matching the fourth database query result, providing a training adjustment to the query translator.

5. A method comprising:

receiving, by a query translator, a natural language query;

translating, via a prompt generator of the query translator, the natural language query into a first database query based on a database query language;

processing the first database query using a large language model (LLM) to generate a first database query result;

processing a second database query using the LLM to generate a second database query result, wherein the second database query is a natural language equivalent of the first database query that has a different form, expression, or syntax than the first database query;

transforming the first database query result into a first canonical query result and the second database query result into a second canonical query result; and providing a training adjustment to the query translator in response to the first canonical query result mismatching the second canonical query result, the training adjustment prompting the query translator to adjust the prompt generator in response to the training adjustment.

6. The method of claim 1, wherein transforming the first database query result into the first canonical query result comprises:

mapping each row of the first database query result to a column permutation that sorts values in the corresponding row of the first database query result in lexicographic order;

identifying the row of the first database query result that yields a smallest lexicographic order when applying its corresponding permutation;

sorting columns of the first database query result using the column permutation of the identified row of the first database query result; and sorting rows of the first database query result in lexicographic order to obtain the first canonical query result.

7. The method of claim 5, further comprising constructing a bipartite graph connecting columns of the first database query result with columns of the second database query result; and identifying a maximum matching in the bipartite graph; and determining whether the maximum matching covers all columns in the first database query and the second database query result.

8. The method of claim 5, further comprising:

generating a plurality of databases having differing content;

generating a third database query result with the first database query and a second database of the plurality of databases;

generating a fourth database query result with the second database query and the second database;

determining whether the third database query result matches the fourth database query result;

in response to at least the third database query result matching the fourth database query result, providing training reinforcement for the query translator; and in response to at least the third database query result not matching the fourth database query result, providing a training adjustment to the query translator.

9. A computer storage device storing programming instructions for execution by a processor of a system, the programming instructions, upon execution by the processor, causing the system to perform the following operations:

receiving, by a query translator, a natural language query;

translating, via a prompt generator of the query translator, the natural language query into a first database query based on a database query language;

processing the first database query using a large language model (LLM) to generate a first database query result;

processing a second database query using the LLM to generate a second database query result, wherein the second database query is a natural language equivalent of the first database query that has a different form, expression, or syntax than the first database query;

transforming the first database query result into a first canonical query result and the second database query result into a second canonical query result; and providing a training adjustment to the query translator in response to the first canonical query result mismatching the second canonical query result, the training adjustment prompting the query translator to adjust the prompt generator in response to the training adjustment.

10. The computer storage device of claim 9, wherein the programming instructions further cause the system to perform the following operations constructing a bipartite graph connecting columns of the first database query result with columns of the second database query result; and identifying a maximum matching in the bipartite graph, wherein determining whether the first database query result matches the second database query result comprises:

determining whether the maximum matching covers all columns in the first database query and the second database query result.

11. The computer storage device of claim 9, wherein the programming instructions further cause the system to perform the following operations:

generating a plurality of databases having differing content;

generating a third database query result with the first database query and a second database of the plurality of databases;

generating a fourth database query result with the second database query and the second database;

determining whether the third database query result matches the fourth database query result;

in response to at least the third database query result matching the fourth database query result, providing training reinforcement for the query translator; and in response to at least the third database query result not matching the fourth database query result, providing a training adjustment to the query translator.

12. The system of claim 1, wherein the second database query is a known good database query.

13. The system of claim 1, wherein the second database query is a curated database query.

14. The system of claim 1, wherein the training adjustment prompts the query translator to reverse a prior training adjustment of the prompt generator.

15. The system of claim 1, wherein the programming instructions further cause the system to perform the following operation:

translating, via the adjusted prompt generator of the query translator, a subsequent natural language query into a subsequent database query based on the database query language.

16. The system of claim 1, where the query translator includes a machine learning (ML) language model with a transformer architecture.

17. The system of claim 16, where the query translator includes a generative pre-trained transformer.

* * * * *